United States Patent [19]
Combrinck

[11] 3,787,805
[45] Jan. 22, 1974

[54] MECHANICAL EMERGENCY CENTRAL SWITCH ASSEMBLY FOR MOTOR VEHICLE

[76] Inventor: Hendrik Johannes Van Jaarsveldt Combrinck, Stand 44, Comptonville, Johannesburg, South Africa

[22] Filed: Aug. 15, 1972

[21] Appl. No.: 280,749

[30] Foreign Application Priority Data
Aug. 17, 1972 South Africa.............................. 5489

[52] U.S. Cl................ 340/52 H, 340/65, 200/61.45, 180/114
[51] Int. Cl. ............................................ H01h 35/02
[58] Field of Search ......... 340/52 H, 62, 63, 64, 65; 200/42, 44, 61.45, 61.52; 180/114

[56] References Cited
UNITED STATES PATENTS
3,251,033  5/1966  Lawyer.......................... 340/52 H X
2,581,338  1/1952  La Roza........................... 340/52 H

*Primary Examiner*—Alvin H. Waring
*Attorney, Agent, or Firm*—Karl W. Flocks

[57] ABSTRACT

The invention is directed to the complete electrical disconnection of the battery of a motor vehicle by automatic or manual control devices to prevent a fire to be started in the event of an accident or when the vehicle is left unattended, while resetting of the automatic means and reconnection of the battery is by another manual control. The automatic control comprises a resiliently held and spring biassed mass which, when freed, opens at least one switch connected in a conductor leading from one of the terminals of the battery. The resetting manual control is preferably lockable.

4 Claims, 5 Drawing Figures

PATENTED JAN 22 1974					3,787,805

MECHANICAL EMERGENCY CENTRAL SWITCH ASSEMBLY FOR MOTOR VEHICLE

BACKGROUND TO THE INVENTION

Motor vehicles are usually provided with lockable ignition switches but these cut out certain circuits only but portion of the conductors of such circuits, and of circuits controlled by other switches remain alive and could cause a fire should a short circuit have developped in said conductor portions.

FIELD OF THE INVENTION

This invention relates to means for protecting self-propelled vehicles against fire when involved in collisions or accidents and also against fire and theft when the vehicle is left unattended.

SUMMARY OF THE INVENTION

According to the invention means are provided for protecting a self-propelled vehicle against fire due to electrical short circuiting and against theft by disconnecting an electric current supply source of the vehicle, including switch gear to make and break at least the electrical circuit from the electric current supply source of the vehicle, and manually and automatically operated control devices connected to the switch gear; the automatically operated control device comprising a mass held captive in an active position by a resiliently biassed member and against the action of a resilient biassed element connected to the mass while said biassed member is adapted to permit release of the mass when the vehicle is subjected to shock for the biassing element to place the switch gear in a circuit breaking position whereas a manually operated device is connected to the mass and the switch gear for return of the mass to the active position and the switch gear to a circuit making position, a second manually operated device being provided and adapted to place and retain the switch gear in the circuit breaking position.

The mass is displaceable from its active and biassed position in substantially any direction when subjected to a substantially horizontally directed shock and after such displacement and release the mass is forceably transferred in one direction to cause the switch gear to be moved from the circuit making position to the circuit breaking position. The manually operated control devices are provided with actuating parts which are preferably at a distant position from the switch gear. At least the second manually operated control device is associated with a key operated lock which is adapted to prevent resetting of the automatic device and placement of the switch gear in the circuit making position so that the engine of the vehicle cannot be started unless such lock is unlocked with the aid of a key.

According to one form of the invention, a pair of contact terminals of the switch gear are mounted within an enclosed housing and connected electrically in a circuit from one of the terminals of the battery of the vehicle. One of the contacts is biassed by spring means onto the co-acting contact while the contact is broken by separation of the movable contact from the fixed contact by means of a rotatable cam mounted on a journalled shaft which in turn is connected to the two manually operated devices and also to the automatically operated device by crank arms.

Additional contacts for making and breaking other electrical circuits of the vehicle may be incorporated in the switch gear. Said additional contacts are opened and closed by a mechanism connected to a crank arm of the shaft.

The contacts within the housing are preferably mounted on a semi-elliptical spring adapted to maintain contacting engagement of the contacts and against the action of which the movable contact is displaced for breaking of the electrical circuit. Advantageously a plaited conductor is provided within the housing between the movable contact and a fixed terminal.

The manually operated control device for placement of the switch gear in the circuit making position and the placement of the automatically operating device in the active position is engageably associated with a crank arm of the shaft for said device to effect operation of such movements simultaneously.

Conveniently the manually operated control devices comprise cables, preferably sheathed cables, of which the core cables are connected to the crank arm means of the shafts. The cable of the manual control device for resetting of the switch gear in the circuit making position extends through a hole in a rotatably mounted crank pin of the shaft and is provided with spaced thickened portions located on opposite sides of the crank pin while the cable is further extended for attachment thereto of the mass while the end is connected to a tension spring which provides the bias on the mass in a direction away from the said crank pin. The mass is preferably in the form of a sphere or ball which is located in a horizontal casing in spaced relationship to the walls of the casing by shallow depressions in the casing bottom and a casing top. The casing top may comprise a hinged lid which is resiliently pressed down by a spring of adjustable force and which forms the aforesaid biassing member.

The means according to the invention is preferably fixed at a concealed position on the vehicle and is advantageously held in a lockable encasement from which the said sheathed cables extend and to which one end of the sheath is fixed. The conductors extending from the various contacts are preferably concealed. The contacts of the additional switches of the switch gear may be connected in circuits of the generator and the coil.

The means according to the invention provides for entire power and electric current supply cut off. The means provides, firstly, for the safety of the occupants of a motor vehicle and secondly for the vehicle itself against fire should the vehicle be involved in a collison which could cause the outbreak of fire. The means also renders the stealing of the vehicle to be extremely difficult. Further it safeguards the vehicle against short circuits which could occur overnight or when parked. In addition it provides for means to stop the sounding of a hooter when accidentally energised.

In order that the invention may be clearly understood and carried into effect reference will now be made to the accompanying sheet of drawings.

BRIEF DESCRIPTION OF THE DRAWINGS

In the drawings:

FIG. 1 is a side elevation of switch means for disconnecting an electrical supply source in a selfpropelled vehicle, constructed according to the invention;

FIG. 2 is a plan of FIG. 1;

FIG. 3 is a fragmentary cross-section on line III—III of FIG. 2;

FIG. 4 is a cross-section on line IV—IV of FIG. 1; and
FIG. 5 is a cross-section on line V—V of FIG. 4.

DESCRIPTION OF PREFERRED EMBODIMENT

Reference numeral 10 denotes a rigid and preferably permanently sealed rectangular housing for rigid mounting within a motor vehicle, conveniently within the engine compartment and close to the battery of the vehicle. Transversely across and within the upper portion of the casing 10 is a rotatably mounted shaft 12. The shaft 12 has a substantially diametrically recessed centre portion adapted to form a cam 14. Within the casing a conductive semielliptical metallic spring 16 is mounted in insulated fashion and conductively fixed by one end to a terminal 18 which is mounted in insulated fashion in the bottom and towards the rear end of the casing 10. The spring 16 carries a large terminal contact 20 on the opposite and free end. In the top 10.1 of the casing 10 and substantially inline with terminal 18, a co-acting large terminal contact 22, for engagement by terminal 20, is provided and which is mounted adjustably on the casing to vary the extent of penetration into the casing 10. The terminals 20 and 18 are connected in a conductor 24 extending from the vehicle battery.

Longitudinally across the top of the casing 10 is a rotatably mounted rod 26 of insulated material having at spaced positions two diametrical conductor elements 28. At the position of the conductor elements 28 the rod 26 is engaged from opposite sides by pairs of brushes 30, 30.1 to which conductors 24.1 for different electrical circuits from the generator and the coil are connected. Also on the rod 26 is a crank arm 32 which is connected by a connecting rod 34 to a crank arm 32.1 provided on an end of shaft 32, exteriorly of the housing 10. The arrangement is such that on rotation of the shaft 12, through a limited angle, the rod 26 is also rotated to make or break the electrical circuits connected to the pairs of brushes 30, 30.1. On rotation of the shaft 12 through an angle of approximately 90° the end of the spring 16 carrying the terminal 20 is forced downwards or is permitted to return upwardly due to the resiliency of the spring for separation or closing of the contacts 20, 20.2. On opening of the contacts 20, 22 the said other circuits are also broken, and vice versa. The connecting rod 34 is preferably of adjustable effective length.

On the opposite end of the shaft 12 and exteriorly of the casing, a grooved wheel 38 is fixed having spaced transverse notches 40 in the sides of the groove for selective engagement of a transverse end bar 41 on the internal or core cable 42 of a sheathed cable, also known in the trade as a "Bowden cable," 44. On applying tension on the opposite end of the cable 42 the shaft 12 is rotated through a limited angle in one direction to cause opening of the circuits through the contacts 20, 22; brushes 30 and 30.1. On the said shaft 12, carrying the crank arm 32.1, a further crank arm 46 is provided having a rotatable crank pin 46.1 in which a diametrical hole is provided and through which a core cable 42.1 of a second sheathed cable 44.1 is movably engaged. On core cable 42.1 a pair of spaced thickening elements 48 are fixed, preferably adjustable. Said elements 48, on axial movement of the core cable 42.1, are adapted to engage the crank pin 46.1 for displacement of the crank arm 46 and rotation of the shaft in either direction, depending on the direction of movement of the cable 42.1 and the side of the crank pin 46.1 engaged by either of said elements 48.

Fixed to the housing 10 by a rigid arm 11 is a casing 10.1. Within the casing 10.1 and in spaced relationship to the sides thereof is a heavy mass in the form of a ball 50. The ball 50 is locatable in a position towards the front of the casing by having diametrically opposed top and bottom portions engaging in shallow recesses 52 provided in the bottom of the casing and at a corresponding position in a lid 51 which is connected by a hinge 51.1 to one wall of the casing 10.1. The ball 50 is fixed onto the cable 42.1 which extends diametrically through the ball while the extreme end of the cable 42.1 is connected by a tension spring 54 to a rigid distantly positioned anchor pin 56. The lid 51 is resiliently retained in the closed position by an elliptical spring 58 of which the force to retain the lid in the closed position is adjustable.

Figures 1, 2, 3, 4, 5:
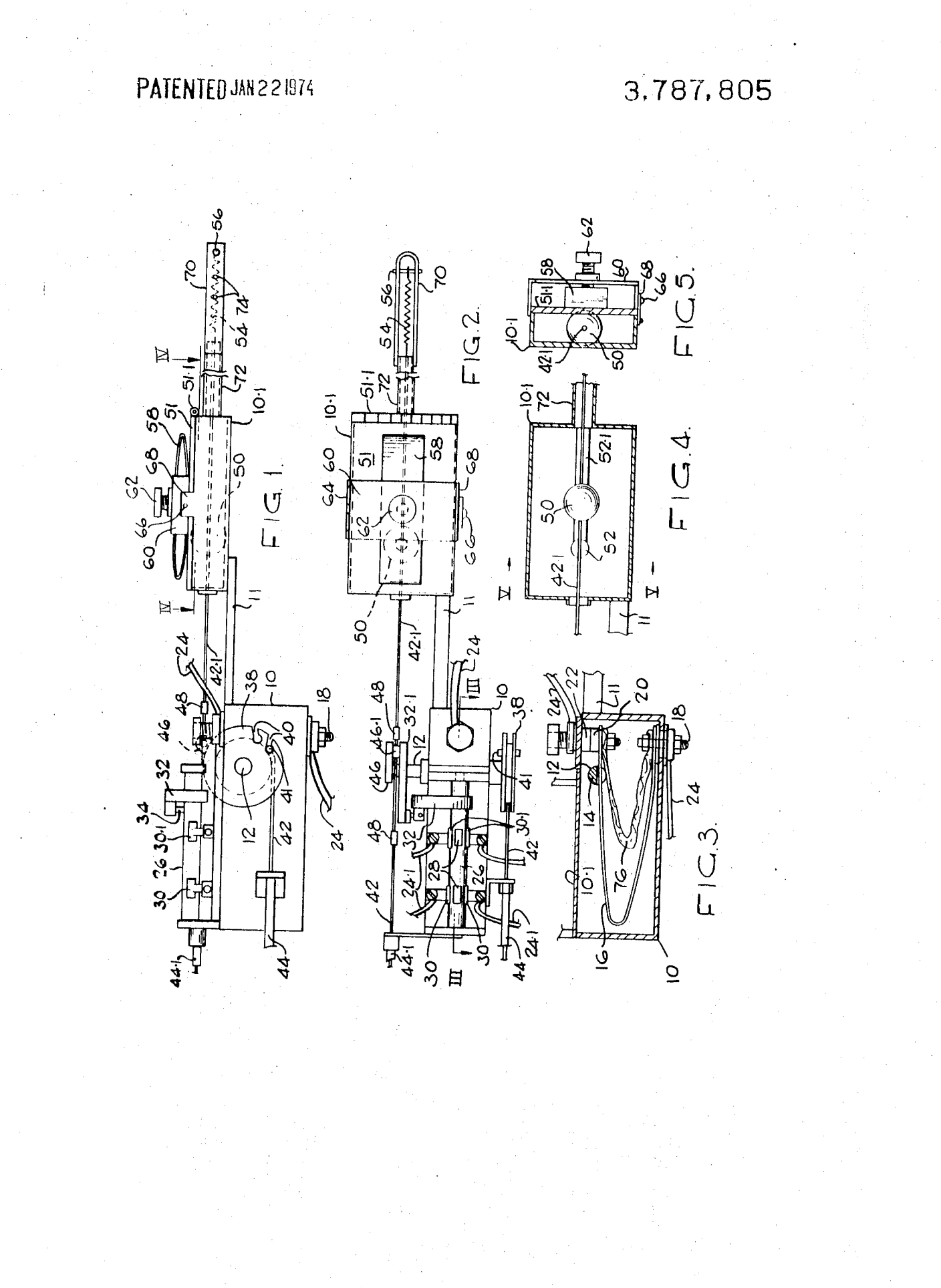

When the vehicle mounting the means according to the invention is subjected to shock, the ball 50 is freed from the recesses 52 against the resiliency of spring 58 and is displaced rearwardly in the casing 10.1 by the spring 54 causing the foremost thickened elements 48 to strike the front of the crank pin 46.1 of crank 46 to cause partial rotation of the shaft 12. Such rotational movement of the shaft 12 causes breaking of the electrical circuits. Resetting of the ball 50 to its resilient captive and active position is effected by operating the cable 42.1 by drawing on a knob (not shown) on the operating end of such cable. By the resetting action of the cable 42.1 the rearmost thickened element 48 engages the crank pin 46.1 from the opposite side to cause the shaft 12 to be rotated in an anti-clockwise direction (see FIG. 1) for re-instating the electrical circuits.

The spring 58 is disposed between the lid 51 and a bridge piece 60 while the force exerted by the spring is variable by an adjusting screw 62. The adjusting screw 62 is engaged in a centre screw-threaded hole in the bridge piece 60 which extends across the casing 10.1 in spaced relationship. The bridge piece 60, which is of inverted U-shape, is connected by one end to the casing 10.1 by a hinge 64 while the opposite end provides a short projection 66 for engaging, clip-in fashion, into a holed resilient lug 68.

The spring 54 is disposed with clearance within a narrow frame 70 which is secured to an outwardly directed end of a horizontal robust tubular support 72 projecting from the rear end of the casing 10.1. In the frame 70, a number of transverse holes 74, are provided for selective engagement of the anchor pin 56 to vary the tension of the spring 54.

To lock the switch gear in the circuit breaking position the cable 42 is drawn outwardly to cause clockwise rotation of the shaft 12 (see FIG. 1). When the cable 42 is drawn outwardly and the shaft 12 rotated, the shaft 12 and associated parts remain in the new position and return to the circuit making position is effected by drawing the cable 42.1 outwardly. When providing the operating end of cable 42 with a key operated lock the switch gear may be locked in the circuit breaking position. When the cable 42 is operated the crank pin 46.1 engages the rearmost thickened element 48 causing inward drawing of the cable 42.1. Due to the flexibility of cable 42.1, the ball 50 is not affected and remains in its located position in the recesses 52.

If desired, a shallow groove 52.1 may be provided in the bottom of casing 10.1. The depth of said groove 52.1 should be less than the depth of the recess 52. The rearward displacement of the ball 50, due to shock, may thereby be facilitated.

The means illustrated in the drawings is preferably located within a lockable casing which in turn is fixed to the vehicle and advantageously close to the battery. Within the housing, and disposed inside the semi-elliptical spring 16 a heavy duty and readily bendable plaited conductor 76 is provided which is connected to the contact 20 and the terminal 18.

With the grooved wheel 38 spring means, not shown, may be associated to assist the operation of the manual control cable 42. Such spring means is preferably connected to the grooved wheel 38 and an anchoring device at different positions to vary the force applied by such spring means.

The battery of the vehicle is preferably mounted in a protective encasement and provided with a dummy conductor while the active conductor is concealed and/or located in a tube.

According to a modification of the invention rotation of the shaft 12 to the position for closing the switch gear is controlled by only cable 42 while cable 42.1 is used only for placement of the mass or ball 50 in the active position. For this modification the cable must have sufficient rigidity so that when the cable is forced inwardly the shaft is rotated in the anti-clockwise direction (FIG. 1) while the thicker element 48, between the crank pin 46.1 and the ball 50, is not provided. A spring, not shown, may be connected to the grooved wheel 38, to assist or bias the shaft 12 in a direction to close the switch gear.

We claim:

1. A mechanical emergency control switch assembly for a motor vehicle to protect the vehicle against fire due to electrical short circuiting, and against theft, by disconnecting an electric current supply source of the vehicle and having electrical switch gear with contacts connected in at least an electrical circuit from the said source and which switch gear is placeable in a circuit making closed position and a circuit breaking open position; including a mass substantially horizontally movable within a casing, a flexible mechanical connection between the mass and the switch gear, a spring biassing the mass to an inactive position, a spring loaded catch mechanism within the casing and adapted to retain the mass in an active position which is spaced from the said inactive position and against the action of the biassing spring acting on the mass whereas said mass is automatically releasable from the active position for return to the inactive position when the vehicle is subjected to shock and for thereby transferring the switch gear from the closed to the open position, a manually operated tensionable flexible element connected to the switch gear and the mass for mechanically resetting and transferring the mass from the inactive position to the active position and simultaneously transferring the switch gear from the open position to the closed position; and a second manually operated tensionable flexible element extending from the switch gear for transferring the switch gear from the open position to the closed position.

2. A mechanical emergency control switch assembly for a motor vehicle as claimed in claim 1 wherein the force of the spring loaded catch mechanism acting on the mass is changeable for varying the sensitivity of retainment of the mass in the active position.

3. A mechanical emergency control switch assembly for a motor vehicle as claimed in claim 1 wherein the manually operated tensionable flexible member for placement of the switch gear in the closed position and resetting of the mass in the active position comprises a flexible cable passing through an operating arm of the switch gear and having the mass and a biassing spring attached to end regions thereof, said cable providing a pair of spaced thickened elements on opposite sides of an operating arm of the switch gear, the one element being adapted to engage one side of the operating arm when the cable is drawn in one direction by the biassing spring attached to the mass when the latter is set free when in its active position while the other thickened element engages the opposite side of the arm when the cable is drawn manually in a direction against the direction of operation of the biassing spring for simultaneous placement of the switch gear in the closed position and resetting the mass in the active position.

4. A mechanical emergency control switch assembly for a motor vehicle as claimed in claim 1 wherein the manually operated member for placement of the switch gear in the open position comprises a cable engageable in hook-like formations provided in flanges of a grooved wheel fixed to a rotatable oscillatable shaft having means for mechanically opening and closing of co-acting contacts of the switch gear and a crank arm to which the mass and the manually operated switch closing device are attached.

* * * * *